United States Patent [19]

White

[11] Patent Number: 4,516,116
[45] Date of Patent: May 7, 1985

[54] APPARATUS FOR VISUALLY DISPLAYING THE LOAD-MOMENT, AXLE-LOAD, OR PAYLOAD OF A VEHICLE

[75] Inventor: Iain S. White, Leamington Spa, England

[73] Assignee: Safety Devices (Engineering) Limited, Suffolk, England

[21] Appl. No.: 331,154

[22] Filed: Dec. 16, 1981

[51] Int. Cl.³ ............................................. G08B 21/00
[52] U.S. Cl. ........................................ 340/685; 73/65; 340/665
[58] Field of Search .................. 340/52 R, 52 H, 665, 340/666, 668, 673, 685; 73/65, 862, 862.04

[56] References Cited

U.S. PATENT DOCUMENTS 3,411,348 11/1968 Schulteis .
4,178,591 12/1979 Geppert .............................. 212/155
4,218,672 8/1980 Weisshappel et al. ............ 340/52 R

FOREIGN PATENT DOCUMENTS 1299907 10/1970 United Kingdom .
1432391 4/1973 United Kingdom .
1500501 4/1974 United Kingdom .
1517758 10/1975 United Kingdom .

Primary Examiner—Glen R. Swann, III
Attorney, Agent, or Firm—Poms, Smith, Lande & Rose

[57] ABSTRACT

A visual display unit for displaying variations in the quotient of applied load and safe working load for a vehicle, such as a mechanical handling or load-carrying vehicle, has a pictorial representation of the vehicle applied to a display panel and a plurality of lights positioned around the representation and arranged to be illuminated at different predetermined quotient levels so as to provide a primary visual indication of an increase in load towards an unsafe condition. In addition the lights and the representation are mutually disposed such that a secondary visual indication is provided showing the cause of an increase in applied load and how it may be reduced.

6 Claims, 8 Drawing Figures

TELESCOPIC JIB CRANE

TELESCOPIC JIB CRANE

FORKLIFT

EXCAVATOR

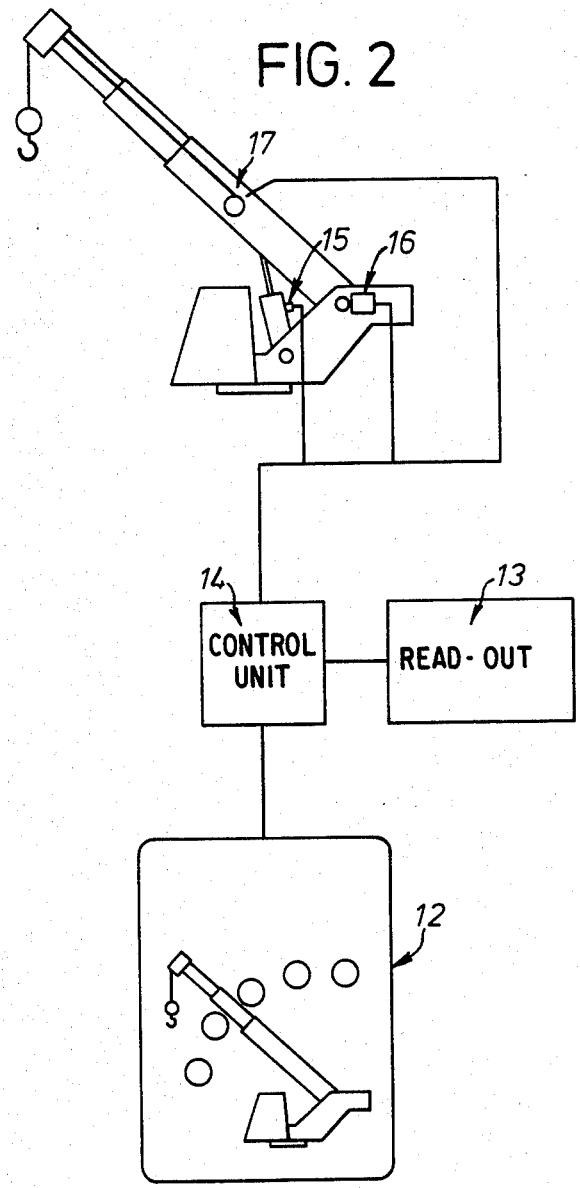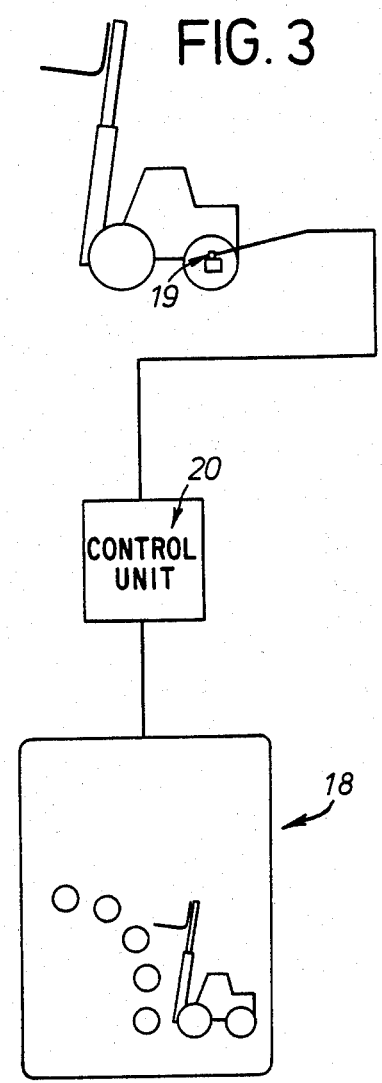

3 AXLE COMMERCIAL VEHICLE

OFF-HIGHWAY DUMP TRUCK

APPARATUS FOR VISUALLY DISPLAYING THE LOAD-MOMENT, AXLE-LOAD, OR PAYLOAD OF A VEHICLE

FIELD OF THE INVENTION

This invention relates generally to a visual display unit and more particularly to a visual display unit utilized to display the load-moment, axle load or payload of a vehicle, hereinafter referred to as "applied load", relative to its rated maximum load-moment, axle-load or payload which it can safely manage under specified working conditions, i.e. which will not cause overturning, overstressing or excessive ground pressure, and hereinafter referred to as the "safe working load". The invention also includes a method of sensing and displaying variations in the quotient of applied load to safe working load.

BRIEF DISCUSSION OF THE PRIOR ART

At present a so called Load Indicator or Safe Load Indicator has a displaying unit which is mounted in the vehicle cab and provides the operator with a visual warning of the approach to a safe working load and an audible warning when the safe working load has been exceeded. The display unit reproduces load data from sensors appropriately positioned on the vehicle.

As a first example safe load indicators are required by law in certain parts of Europe on jib cranes to display the safe working load of the crane on any configuration of boom length, boom angle, boom radius, hoist and stabilisers and simultaneously to display the boom parameter values and the applied load as determined from sensors appropriately positioned on the vehicles. The operator firstly sets up his equipment to determine that the known load he is required to lift will be within the safe working load throughout the lifting operation. Secondly he corrects the configuration if necessary. Then he may proceed with the lift, periodically checking the applied load against the safe working load to ensure that an overload never occurs whereby the appled load exceeds the safe working load and, should it occur however for some unforeseen reason, to be ready to take remedial action in accordance with the load, radius and angle information. This principle will be referred to as a Designed Lifting Operation. Typical known safe load indicators are disclosed in U.K. Patent Specification Nos. 1299907 and 1500501.

A second example is the ASEA load indicator which is intended to indicate the gross weight, net load, load change an axle loading of trucks and lorries. The various loadings are sensed by a number of load transducers welded to the vehicle axles and the signals pass to an electronic control unit. A display unit in the vehicle cab has a single digital read-out which normally indicates gross weight but by pressing appropriate buttons it can show axle loadings or net load. The highest permitted axle loading is indicated by an external alarm. The transducer preferred for the measurements in the ASEA system is disclosed in U.K. Patent Specification No. 1517758. Other load cells are known from U.S. Pat. No. 1432391 and U.S. Pat. No. 3,411,348.

Development of mechanical handling has created a wide variety of equipment performing lifting operations similar to cranes. While a requirement to fit a safe load indicator to these is implied in some regulations applied to cranes the operation of newer equipment is not compatible with a Designed Lifting Operation. For example, forklift trucks, telescopic handlers, and lorry loaders cope with very large numbers of lifts involving unknown payloads and different sites within each operational shift. The quantity of information presented for a Designed lifting operation is too much to be processed reliably within the short duration of intensive operations. Proper use would considerably slow down production and lead to abuse of both the safe load indicator and the principle.

A further disadvantage is that the combined size of the visual displays required restricts the positioning of the displays to areas away from the operator's natural line of sight of his payload in order to avoid blocking his view. Accordingly, the accuracy of reading existing displays at a normal working distance of typically 1 meter, being the separation of the operator's eye from the surface of a visual display mounted in a vehicle cab, is severely limited. Analogue meters display as much as 75% redundant information by providing a four-fold reduction in optimum discrimination as the safe working load is approached. In practice the applied load is only significantly important within 25% of the safe working load, vehicles operating below 75% of safe working load are being underutilised and hence not realising their potential productivity. Owing to the integrating times inherent in digital displays and the human eye, trends in parameters as the applied load is altered become more difficult to follow as the rate of change increases, for maximum accuracy the rate of change must be zero.

SUMMARY OF THE PRESENT INVENTION

None of the known systems disclose a visual display unit which provides anything other than one or more simple analogue meters or digital read-out references. The primary object of the present invention is to provide an improved visual display unit for a vehicle load indicator. The visual display unit of the present invention combine the information to be derived from separate parameter values into a single display from which all the data relating the applied load to the safe working load can be assimilated instantaneously by the operator for rapid application of appropriate corrective action to prevent overload.

According to the present invention there is provided a visual display unit for displaying variations in the quotient of applied load and safe working load for a vehicle, the visual display unit comprising display means, a representation of the said vehicle on the display means, and visual transducer means of the display means providing a primary visual indication of the quotient of applied load to safe working load, the visual transducer means and the representation being so disposed relative to one another on the display means that a secondary visual indication is provided showing the cause of an increase in applied load and how it may be reduced.

In an embodiment of the present invention the unit eliminates the necessity for some of the variable leading parameters to be specifically measured.

Preferably, the visual display unit is sized specifically for positioning close to the operator's natural line of sight by optimizing between legibility and blockage.

The visual display unit of the present invention may be additional to a proprietory safe load indicator for use as a repeater station located at alternative operating stations or placed closer to the operator's natural line of sight. Suitably the visual display unit is positioned where it can be read to an accuracy at least equal to the overall accuracy of the measuring system at the typical distance between the operator's eye and the face of the visual display unit then mounted of an internal cab surface facing the operator, typically 1.0 meter. Typical legislation requires an accuracy of ±5%.

In the preferred arrangement the primary and secondary visual indications in the working visual impression of the unit is concentrated towards the most significant sector of the parameter being displayed.

In an embodiment particularly designed for load carrying on a multi-axle vehicle, the visual display may be in a form suitable for displaying, without manual switching, the nearest applied load to the safe working load among the individual axle loads.

According to another aspect of the present invention there is provided a method of sensing and displaying variations in load on a vehicle comprising the steps of mounting a load cell on the vehicle, sensing the applied load, resolving the sensed applied load into the quotient values, providing a visual display with a representation of the vehicle and variable visual transducer means, varying the appearance of the visual transducer means in response to variations in said quotient values thereby providing a primary visual indication of increase in loading towards an unsafe condition and positioning the variable visual transducer means in such position relative to the vehicle representation that a secondary visual indication is provided showing the cause of the increase in applied load and how it may be reduced.

Means for calculating the quotient and varying the impression of the visual transducer, in response to signals from a load measuring device will come readily to the minds of those skilled in the art and with reference to the prior specifications referred to above.

The visual transducer means and the representation are so disposed relative to one another on the display means that the secondary visual indication in respect of a mechanical handling vehicle shows the ccorresponding reduction in the permitted movements of the implements of a mechanical handling vehicle as the quotient increases. Alternatively, in a load-carrying vehicle the disposition provides a secondary visual indication showing which of the axles and gross vehicle weight approaches the greatest quotient.

Preferably, the visual transducer means comprises an array of a plurality of light-emitting diodes arranged to be illuminated at different predetermined quotient levels. Therefore, in accordance with a preferred embodiment of the invention an improved visual display unit for displaying variations of the quotient of applied load to safe working load on a mechanical handling, or load carrying vehicle, the visual display unit comprising a display panel bearing a pictorial representation of the said vehicle, and an array of lights on the display panel arranged to be illuminated at different predetermined quotient levels thereby providing a primary visual indication of the increase in loading towards an unsafe condition, the array of lights being arranged around the representation of the vehicle so that, in a mechanical handling vehicle, the path of the lights follows the lifting and increasing radius of the pay load, and, in a load-carrying vehicle, the path of lights follows an upward path with increasing payload, thereby providing a secondary visual indication showing the cause of an increase in applied load and how it may be reduced.

The need to measure and display the load radius from boom extension, and boom angle measurement is eliminated whenever the applied load can be measured such that the output from the load cell is also a direct measure of the load moment: for example the residual rear axle load on a counterbalance forklift truck. The path of the lights corresponding to an increase in applied load thereby also implies the appropriate reduction in permitted load radius. Alternatively, the array of lights being arranged around a representation of the load carrying vehicle so that a number follows an upward path with increasing load and one is adjacent to each axle on the representation thereby providing a secondary visual indication of which axle load approaches an overload the closest. If the gross vehicle weight safe working load is approached earlier than any of the axle values all the lights adjacent to the axles illuminate simultaneously.

BRIEF DESCRIPTION OF THE DRAWINGS

The invention will now be described by way of example with reference to the accompanying drawings in which:

FIG. 2 is a diagrammatic drawing of a typical load indicator installation on a telescopic jib crane;

FIG. 3 is a diagrammatic drawing of a typical load indicator installation on a forklift;

DESCRIPTION OF THE PREFERRED EMBODIMENTS

Figure 1A:
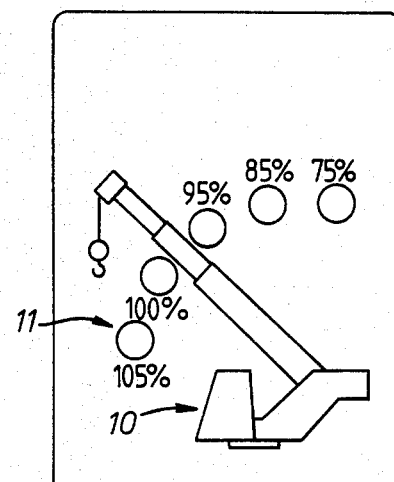
FIGS. 1a, 1b and 1c are front elevations of preferred load indicator visual display panels in accordance with the invention applying to mechanical handling vehicles.
Figure 1B:
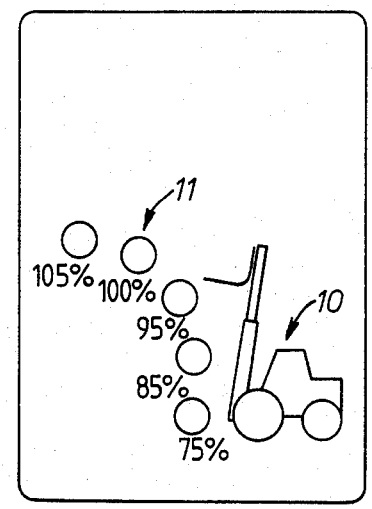
Figure 1C:
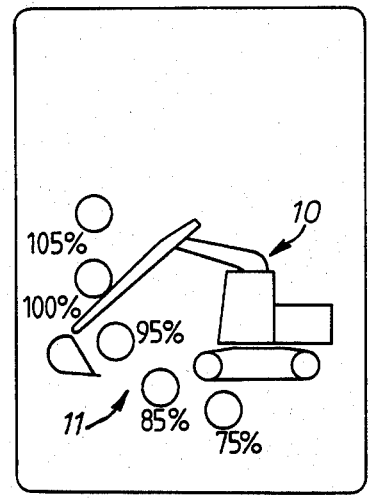

In the drawings, FIGS. 1a, 1b and 1c illustrate various visual display unit panels in accordance with the invention to be located in the cab of a mechanical handling vehicle and which displays the quotient variations in visual form. Suitable dimensions for the display panel to provide optimum legibility with minimum blockage of view in the operator's line of sight in a vehicle cab are Height—110 mm
Breadth—80 mm FIG. 1a illustrates a panel for telescopic jib crane with a pictorial representation 10 of the vehicle and an array of five lights which are illuminated respectively when the applied load equals 75%, 85%, 95%, 100% and 105% of the safe working load, (the safe working load being about 25% below the absolute maximum design load limit). The array is curved with respect to the pictorial representation to illustrate the lift and tilt capability of the vehicle. Thus the array indicates that, as the boom moves outwardly and downwardly, increasing the load radius, the vehicle becomes less stable and subjected to a greater bending moment tending to fail the vehicles structural components. If the load and movement of the boom bring the vehicle into an overload condition as indicated by illumination of the lights 11 then the operator can see at a glance that, in order to bring the vehicle back into a safe condition, it is necessary to move the boom upwardly and inwardly.

FIGS. 1b and 1c respectively illustrate a similar arrangement for a forklift truck and an excavator whereby a visual indication of the causes and remedy for an overload condition occurring is provided. The lights 11 arranged around the representation follow the increasing radius of the load.

FIG. 2 illustrates the visual display according to the present invention 12 additional to a conventional analogue meter or digital read-out 13 of a crane safe load indicator control unit 14 measuring lift force, boom angle, and boom length respectively sensed from a pressure transducer 17, calculating the applied load, the hook load, the load radius and safe working load and the quotient of applied load to safe working load.

FIG. 3 illustrates a visual display unit 18 according to the present invention linked to a load cell 19 on the rear axle of a forklift truck via a control unit 20. As a payload is lifted on the forks and the mast of the forklift truck is tilted forward, the applied load in the form of a load moment increases simultaneously reducing the preload on the rear axle in direct proportion governed by the wheelbase; the control unit transforming the change in axle preload into the quotient values and varying the visual impression of the visual display accordingly. As the payload is increased the amount by which the payload can be raised or the mast tilted forward before the 105% light is illuminated will be reduced. Thus the effective sensitivity of the visual impression to changes in load elevation and radius is increased automatically without any necessity to measure lift height or angle of tilt.

Figure 4A:
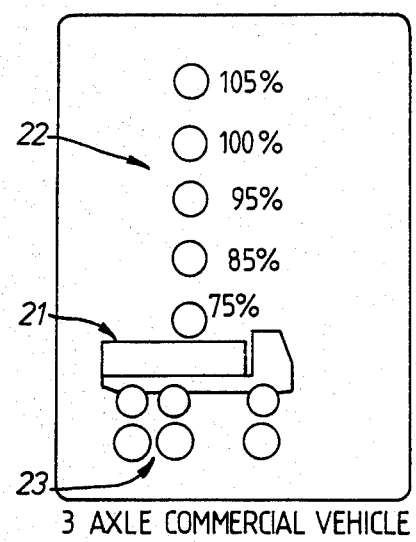
FIGS. 4a and 4b are front elevations of preferred load indicator visual display panels in accordance with the invention applying to load carrying vehicles.
Figure 4B:
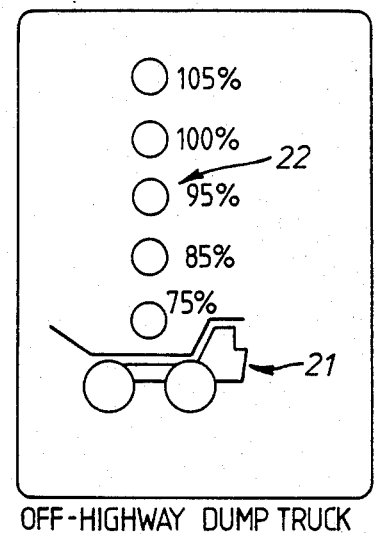

FIGS. 4a and 4b illustrate visual display unit panels, in accordance with the present invention, to be located in the cab of a load carrying vehicle, and which displays the quotient values in visual form. FIG. 4a illustrates a panel for a three axle commercial vehicle with a pictorial representation 21 of the vehicle and an array of lights, five of which 22 are illuminated when the applied load equals 75%, 85%, 95%, 100% and 105% of the safe working load. The remaining three lights 23 are placed adjacent to the axle locations in the representation and are illuminated as appropriate showing which axle carries its greatest quotient to which the five lights 22 then refer. For different numbers of axles on the vehicle the number of wheels on the representation is adjusted to suit and the number of axle lights 23 is adjusted correspondingly. Whenever specified axles are designed to be load-sharing the individual lights 23 for each should preferably come simultaneously, alternatively the separate lights shall be combined into a single light placed suitably adjacent to the load-sharing combination. If the quotient relating to the gross vehicle weight is higher than the quotient relating to the most highly loaded axle all the lights 23 will be illuminated simultaneously.

FIG. 4b illustrates a similar arrangement in which the gross vehicle loading is more important than individual axle loads a typical example would be an off-highway dumptruck.

Figure 5:
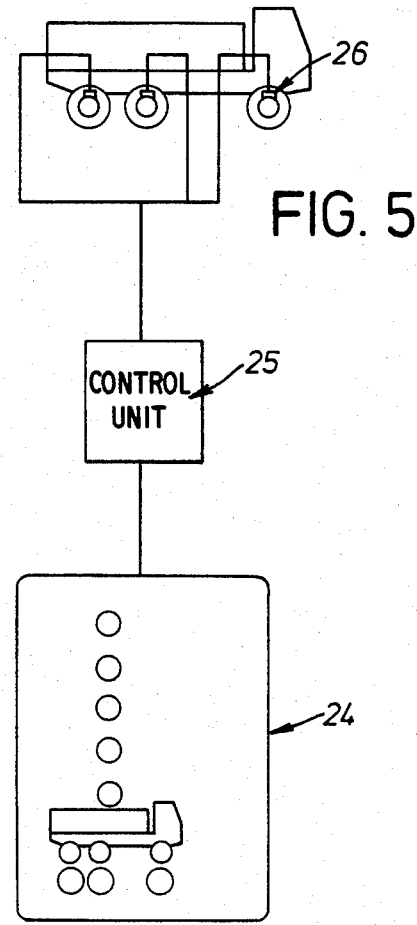
FIG. 5 is a diagrammatic drawing of a typical load indicator installation on a three axle lorry.

FIG. 5 illustrates a visual display unit 24 according to the present invention linked to a control unit 25 measuring the applied load on each axle sensed from load cells 26 and calculating the quotient of applied load to safe working load for each axle and the gross vehicle.

Referring again to FIGS. 1a, 1b, 1c, 4a and 4b the lights 11 and 22 are few in number and widely separated in order that the transition in the visual impression between quotient levels is discriminated with the minimum of concentration by the operator. Suitable linear spacing for lights on the panel size aforesaid is 15 mm. The lights are arranged to be illuminated at levels separated by the tolerance band specified in the design brief.

Levels afore specified at 75%, 85%, 95%, 100%, and 105% corresponds to a tolerance of ±5% around the safe working load (100%). Below 95% the approach to the safe working load is not so critical so a wider spacing of levels is more acceptable for practical operation. Other accuracy requirements can be accomodated by rearranging the illumination levels accordingly. Taken together these features ensure that the accuracy of the operator's impression of the level of high applied load is always equal to the specified accuracy of the load measuring system.

The light first illuminating at 75% has valuable impact as a device to draw the operator's attention to the fact that his applied load is approaching the safe working load sufficiently closely that he should exercise greater caution from then on. In addition operations which do not illuminate any lights are under productive so there would be a benefit from increasing the average payload by for example fitting a larger bulk material handling bucket to a forklift or wheeled loader. Through the present invention any suitable load measuring device can become on On-Board Productivity Monitor.

Although the vehicle representation has been disclosed as a permanent pictorial representation on a display panel it may, if desired, be produced by a programmed electro-luminescent display or alternatively, cathode ray tube display. Similarly, the visual transducer means, instead of being an array of lights, may be a variable electro-luminescent display or alternatively a cathode ray tube display. The display unit may be built into a control unit or self-contained.

I claim:

1. A visual display unit for displaying variations in the quotient of applied load to safe working load for a mechanical handling vehicle, the visual display unit comprising display means, a representation of said vehicle on the display means, means for giving a primary visual indication of the quotient of applied load to safe load and including visual transducer means for providing different visual indications on the display means, and means for locating said visual transducer means in a predetermined position on said display relative to said representation of said vehicle to give a secondary visual indication depicting increasing and decreasing radius of applied load by the relative locations of successive visual indications on said display.

2. A visual display unit according to claim 1 wherein the display means is a display panel and the representation of the vehicle is a pictorial representation applied to the panel.

3. A visual display unit according to claim 1 or claim 10 wherein the visual transducer means is an array of lights arranged to be illuminated at different predetermined quotient levels.

4. A visual displaying unit for display variations of the quotient of applied load to safe working load on a mechanical handling vehicle, the visual display unit comprising a display panel, a pictorial representation of the said vehicle applied to the display panel, a primary visual indication of the quotient of applied load to safe working load, said primary visual indication comprising an array of lights on the display panel arranged to be illuminated at different predetermined quotient levels thereby providing a visual indication of the increase in loading towards an unsafe condition, and a secondary visual indication illustrative of an increase in applied load, said secondary visual indication being provided by the visual inter-relationship between the array of lights and the pictorial representation of the vehicle, said array of lights being arranged upon a curve positioned relative to the pictorial representation so that the path of the illumination of the lights in the array follows the lifting and increasing radius of the pay load.

5. A method of sensing and displaying variations in the quotient of applied load to safe working load on a mechanical handling vehicle comprising the steps of mounting a load cell on the vehicle, sensing the applied load, resolving the sensed applied load into the quotient values, providing a visual display with a representation of the vehicle, providing the visual display with variable visual transducer means, varying the appearance of the visual transducer means in response to variations in said quotient values thereby providing a primary visual indication of increase in loading towards an unsafe condition, and positioning the variable visual transducer means upon a curve positioned relative to the vehicle representation such that the visual inter-relationship between the representation and the visual transducer means provides a secondary visual indication depicting the increasing radius of applied load.

6. A method of sensing and displaying variations in the quotient of applied load to safe working load on a mechanical handling vehicle according to claim 5 wherein the visual transducer means comprises a plurality of lights, the step of varying the appearance thereof comprising illuminating the lights at different predetermined applied load levels.

* * * * *